(12) United States Patent
Kilzer et al.

(10) Patent No.: US 9,336,122 B2
(45) Date of Patent: May 10, 2016

(54) DEVICE HAVING CONFIGURABLE BREAKPOINT BASED ON INTERRUPT STATUS

(71) Applicant: Microchip Technology Incorporated, Chandler, AZ (US)

(72) Inventors: Kevin Kilzer, Chandler, AZ (US); Justin Milks, Chandler, AZ (US); Sundar Balasubramanian, Chandler, AZ (US); Thomas Edward Perme, Chandler, AZ (US); Kushala Javagal, Phoenix, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 318 days.

(21) Appl. No.: 13/888,370

(22) Filed: May 7, 2013

(65) Prior Publication Data
US 2013/0297975 A1    Nov. 7, 2013

Related U.S. Application Data

(60) Provisional application No. 61/643,707, filed on May 7, 2012.

(51) Int. Cl.
*G06F 11/00* (2006.01)
*G06F 11/36* (2006.01)

(52) U.S. Cl.
CPC ........ *G06F 11/3636* (2013.01); *G06F 11/3648* (2013.01)

(58) Field of Classification Search
CPC ..... G06F 13/385; G06F 15/7814; G06F 1/08;
G06F 11/0727; G06F 11/0793; G06F 13/24;
G06F 9/4812; G06F 8/60; G06F 11/25;
G06F 11/362–11/366; G06F 11/3466–11/3495;
G06F 11/323; G06F 11/36; G06F 11/3604–11/3696
See application file for complete search history.

(56) References Cited

U.S. PATENT DOCUMENTS

| | | | |
|---|---|---|---|
| 5,951,696 A | 9/1999 | Naaseh et al. | 714/34 |
| 2005/0257089 A1 | 11/2005 | Williams et al. | 714/34 |
| 2007/0234017 A1* | 10/2007 | Moyer | 712/227 |
| 2007/0266376 A1* | 11/2007 | Yim et al. | 717/129 |

FOREIGN PATENT DOCUMENTS

WO    2007/112162 A2    10/2007    ............... G06F 9/44

OTHER PUBLICATIONS

International Search Report and Written Opinion, Application No. PCT/US2013/039938, 10 pages, Jun. 24, 2013.

* cited by examiner

*Primary Examiner* — Jason Bryan
(74) *Attorney, Agent, or Firm* — Slayden Grubert Beard PLLC

(57) ABSTRACT

A processor device with debug capabilities has a central processing unit, an interrupt controller, a status unit operable to be set into a first mode indicating an interrupt has occurred or in a second mode indicating normal execution of code, and a debug unit coupled with said status unit and comprising a configurable breakpoint, wherein a condition can be set that a breakpoint is only activated if the device is operating in an interrupt service routine.

20 Claims, 5 Drawing Sheets

DEVICE HAVING CONFIGURABLE BREAKPOINT BASED ON INTERRUPT STATUS

CROSS-REFERENCE TO RELATED APPLICATIONS

This application claims the benefit of U.S. Provisional Application No. 61/643,707 filed on May 7, 2012, entitled "DEVICE HAVING CONFIGURABLE BREAKPOINT BASED ON INTERRUPT STATUS", which is incorporated herein in its entirety.

TECHNICAL FIELD

The present disclosure relates processor devices, in particular microcontroller devices.

BACKGROUND

Modern microprocessors and microcontrollers include circuitry that efficiently allows analyzing a running program by means of a so-called in-circuit debugger or emulator device. To this end, a microcontroller or microprocessor provides for internal circuitry that supports debugging functions and a specific interface which can be for example activated by programming multiple function pins of the device to operate as the debug interface. Such an interface usually can be configured as a high speed serial interface to allow for fast communication between the actual device and the external debugger or emulator. The device itself can thus be operated in a normal operating mode which does not activate this interface and associated pins can be used for other purposes and a debug operating mode which uses this interface to exchange data with respective external devices, such as debuggers or emulators that can be operated from and by an external host computer. The debuggers or emulators can also be operated as programmers, wherein the program is transferred into the target device via the same debug interface. Host computer, external debugger or emulator thus forms an inexpensive analysis and debugging system.

Modern processors and microcontrollers provide for an extended set of debug functions inside the respective device. For example, a number of breakpoints can be set within the device to allow the device to actually run in real time which would not be possible with an external debugger when using just a high speed serial interface and thus would require bond-out chips and expensive debug circuitry. However, the functionality of these internal debug circuitries is of course somewhat limited due to a limited amount of silicon real estate and other reasons. However, these type of breakpoints only allow for a limited amount of configuration.

SUMMARY

Therefore a need exists, for an improved breakpoint configuration within a microcontroller or microprocessor to allow for a more flexible debugging. For example, it would beneficial to allow for configuration of a breakpoint based on an interrupt status. According to various embodiments, such a configurable setting for the breakpoint allows the breakpoint to qualify its matching and halting of the device with the interrupt state.

According to an embodiment, a processor device having debug capabilities, may comprise a central processing unit, an interrupt controller, a status unit operable to be set into a first mode indicating an interrupt has occurred or in a second mode indicating normal execution of code, a debug unit coupled with the status unit and comprising a configurable breakpoint, wherein a condition can be set that a breakpoint is only activated if the device is operating in an interrupt service routine.

According to a further embodiment, the status unit may comprises a final stage interrupt detection unit, and a return from interrupt detection unit. According to a further embodiment, the final stage interrupt detection unit may only generate a logic signal indicating that an interrupt has occurred when the device will be forced to enter the interrupt service routine. According to a further embodiment, the status unit may further comprise a first multiplexer having a first input receiving a logic 1 at a first input and being controlled by the final stage interrupt detection unit; a second multiplexer receiving a logic 0 at a first input and having a second input coupled with an output of the first multiplexer, wherein the second multiplexer is controlled by the return from interrupt detection unit; a clock controlled register receiving an output signal from the second multiplexer and having an output coupled with a second input of the first multiplexer wherein the output of the register indicates a current interrupt status of the central processing unit. According to a further embodiment, the register can be a D-flip-flop. According to a further embodiment, the debug unit can further be configured to activate a breakpoint when the device is not executing an interrupt service routine. According to a further embodiment, the debug unit can further be configured to always activate a breakpoint. According to a further embodiment, the debug unit may comprise a mode selection circuit comprising logic gates to set one of three operating modes, wherein the first mode allows triggering of a breakpoint only when the central processing unit executes an interrupt service routine, the second mode allows triggering of a breakpoint only when the central processing unit does not execute an interrupt service routine, and the third mode always allows triggering of a breakpoint. According to a further embodiment, the device may comprise a breakpoint configuration unit configured to allow breakpoints being defined by at least one of the following conditions, an instruction address; an instruction address range; a data read access to a predefined address and a data write access to a predefined address. According to a further embodiment, a condition of a data write access for a breakpoint may further define a data value of a predetermined data address. According to a further embodiment, a number of breakpoint occurrences can be defined that need to be met before execution of a program is stopped at the breakpoint. According to a further embodiment, the device may further comprise an event combiner operable to combine a plurality of events to generate stop execution of program.

According to another embodiment, a method for debugging executed code within a processor device having debug capabilities, may comprise: executing code by a central processing unit (CPU); determining an interrupt service status of the CPU while executing the code by a debug unit; configuring a breakpoint within the debug unit to be activated only when the CPU is executing an interrupt service routine; and upon occurrence of a breakpoint, only activating the breakpoint within the debug unit if the CPU is executing instructions within an interrupt service routine.

According to a further embodiment of the method, for determining the interrupt service status of the CPU, the debug unit can be configured to determine a final stage interrupt state of the CPU which leads to execution of an interrupt service routine, and to determine execution of a return from interrupt instruction. According to a further embodiment of the method, the debug unit can further be configured to activate a breakpoint when the device is not executing an interrupt service routine. According to a further embodiment of the method, the debug unit can further be configured to always activate a breakpoint. According to a further embodiment of the method, the method may further comprise the step of selecting an operating mode of the debug unit, wherein a first mode allows triggering of a breakpoint only when the central processing unit executes an interrupt service routine, a second mode allows triggering of a breakpoint only when the central processing unit does not execute an interrupt service routine, and a third mode always allows triggering of a breakpoint. According to a further embodiment of the method, the method may further comprise configuring a breakpoint configuration to allow breakpoints being defined by at least one of the following conditions: an instruction address; an instruction address range; a data read access to a predefined address and a data write access to a predefined address. According to a further embodiment of the method, a condition of a data write access for a breakpoint may further define a data value of a predetermined data address. According to a further embodiment of the method, a number of breakpoint occurrences can be defined that need to be met before execution of a program is stopped at the breakpoint.

DETAILED DESCRIPTION

By providing interrupt related settings in the breakpoints, it allows the match condition to be further narrowed down and further qualified. This provides a functionality that is not available in conventional devices. This allows a breakpoint to only match inside of the interrupt service routine (ISR), or match only outside of the ISR.

The various embodiments therefore advance the state of the art in on-chip debug capabilities. According to various embodiments, a device has the ability to accurately determine if the device was executing code from the interrupt routine or from the mainline routine, and to use this information to enable or disable certain breakpoint features accordingly. This configurable setting for the breakpoint allows the breakpoint to qualify its matching and halting of the device with the interrupt state.

Figure 1:
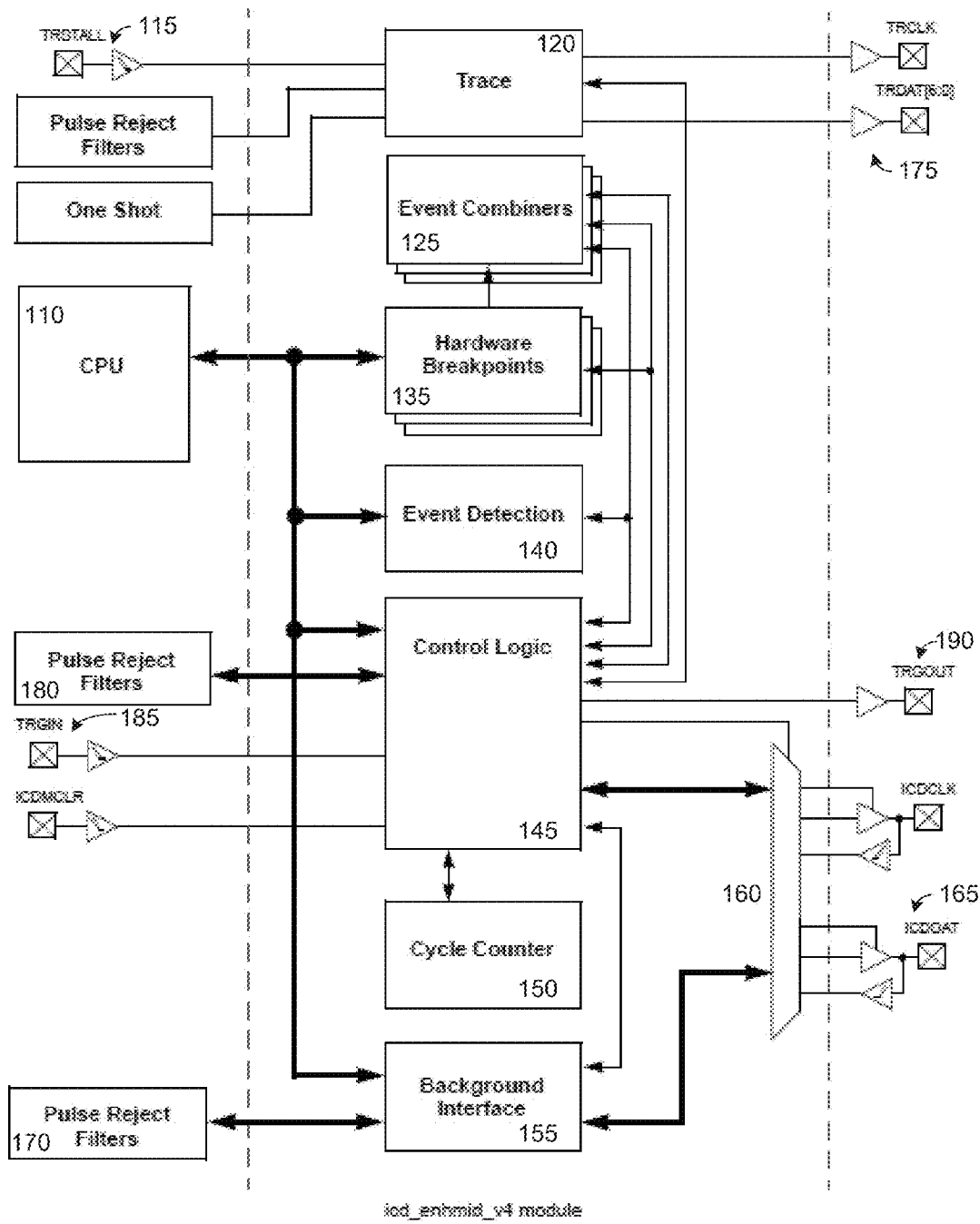
FIG. 1 shows a block diagram of an integrated debug module according to various embodiments.

FIG. 1 shows a block diagram of an in-circuit-debug module that can be integrated within a microcontroller according to an embodiment. However, the general concept as described above can be implemented in other types of on-chip debug circuitry. The block diagram shows a module that can be implemented for example in a microcontroller and may consists of five basic blocks:
Breakpoint Compare Logic 135
Stop-Watch Cycle counter Logic 150
Control and State Machine Logic 145
Trace Logic 120
Event Combiner logic 125

A microcontroller comprises a central processing unit (CPU) 110 and an associated interrupt controller 112 coupled with CPU 110. CPU 110 is furthermore coupled with hardware breakpoint unit 135, event detection unit 140, control logic unit 145 and background interface 155 through an internal bus. Specific functions of these blocks will be explained in more detail below. Multiplexer 160 is used to allow coupling of the debug unit with an external debugger through dedicated debug clock and data pins 165. The control logic 145 may be coupled with one or more external pins. FIG. 1 also shows an exemplary TRGIN pin 185 that may be used with a trace unit 120. Such a pin may be a dedicated pin with no other function. However, in particular in low-pin devices, such a pin may be a multi-function pin that allows to be assigned under program control to different peripheral devices and therefore can perform different functions according to its programmed assignment. For example, such a pin may be programmed by means of a configuration register to be in addition to the trace trigger in function to act as a serial interface clock pin, a digital I/O pin, an analog input pin, etc. As shown in FIG. 1 the control logic also provides for a trigger out pin 190 that can be similar to pin 185 a multi-function pin. The trace module 120 may be coupled with a trace stall input pin 115, and trace clock and data output pins 175. FIG. 1 also shows pulse reject filters 170 and 180 that may be configurable through control logic 145. Signal routing through such filters is not shown in FIG. 1. According to some embodiments, breakpoint debugging is implemented such that execution is halted before the instruction is executed, a so-called "zero skid" operation. According to other debugger embodiments this may not be true and may cause problems with where code stops or "skids", allowing an instruction to execute before the processor is halted. External events are (by definition) asynchronous to the instruction execution stream. As such, their operation cannot be compared to zero skid concepts.

When an internal signal debug_en=1, the module is enabled and monitors all the "HALT" events, generates events, performs data capture, etc. If the internal signal debug_en=0, all debug logic is disabled and the module is configured to consume minimum power mode.

To make debugging less invasive, it may be useful to have a means of streaming data off the device in real-time. The trace module 120 supports a method taking data being read or written to a specific address and transmitting it out the Trace port. This can be described as a Real-time watchpoint. Normal operation of the device is not interrupted when using a watchpoint.

Figure 2:
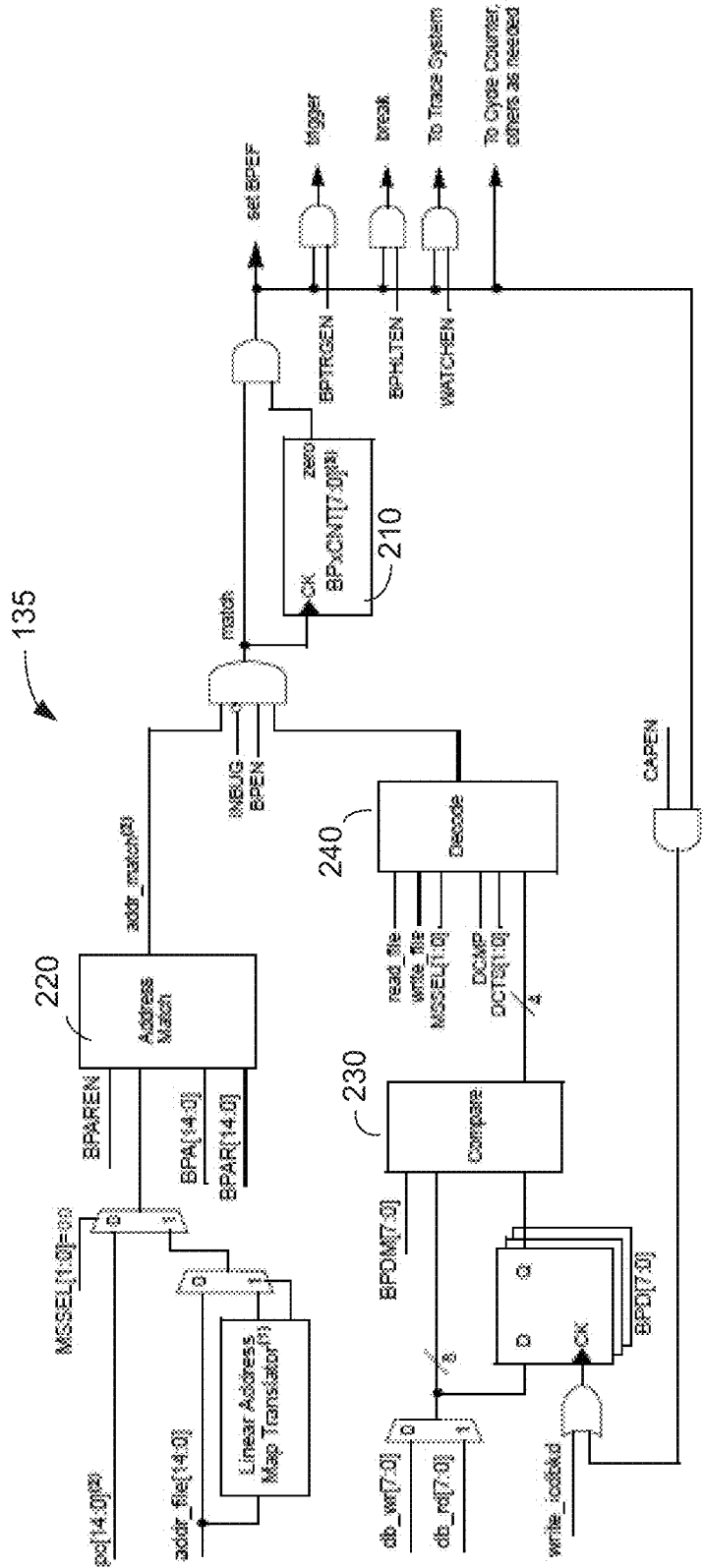
FIG. 2 shows a hardware breakpoint block diagram of FIG. 1 in more detail.

FIG. 2 shows the normal function of the hardware breakpoint unit 135 according to various embodiments. Enhanced functionality will be explained in more detail below. Hardware breakpoints can be configured to break on matching addresses in either program or data memory. To this end, respective comparators 220 and 230 and decoding units 240 are provided as shown in FIG. 2. When the breakpoint is selected to operate on data memory, the breakpoint can additionally be qualified with data value and a mask, allowing only certain values to generate a breakpoint event. Data breakpoints can also optionally be set to only break on read or write cycles. In all cases, the breakpoints have a counter 210 so that the specific event must occur N times before the breakpoint event is generated. This can be set, for example, for any value from 1 to 256 times according to some embodiments.

The block diagram of FIG. 2 is shown for a single breakpoint. The number of breakpoints implemented is however variable according to various embodiments, many breakpoints may exist. FIG. 2 shows an exemplary embodiment that allows various parameters to be programmed to define the trigger requirements for a breakpoint. According to other embodiments, less or more of such parameters may be used. For example, the number of breakpoint occurrences necessary to generate a breakpoint can be set by the BP×CNT parameter in counter 210. Each breakpoint module may have identical registers.

Breakpoints are listed among the event channel definitions and can be used to start or stop the cycle counter 150, set or reset an event combiner stage 125, start or stop trace unit 120, or take a stack snapshot.

According to one embodiment, for the breakpoint to be enabled, the bit BPEN of a control register ICDBP×CON must be set. If this bit is cleared, all circuitry for this specific breakpoint is disabled and no breakpoint events will be generated. The breakpoint can be configured to only trigger an action on every N-th occurrence of the qualifying conditions. For example, to set a breakpoint to trigger on every third occurrence, the counter 210 is set to BP×CNT=2. Respective control registers may be used in combination with counter 210 to reload its value and/or monitor the current state.

Breakpoints may also be qualified based on execution context (main line code, interrupt handler, or either), by setting respective bits, for example in an associated configuration register. A breakpoint may then only occur when the program is executing from a selected context as will be explained in more detail below.

Yet another breakpoint parameter may be used, by setting respective bits in a configuration register, which allow to monitor the program counter (PC execution address). Program Memory breaks are zero skid, and occur before the operation is executed. The PC will indicate the address of the trigger instruction.

When a respective control bit is cleared, e.g. BPAREN='0', a break is triggered when the PC equals a predefined address. When BPAREN=;1', a break is trigged when the PC falls within the predefined inclusive range of addresses.

According to some embodiments, only executed instructions can generate a breakpoint. If the PC is at an address that is not executed, the breakpoint does not trigger. This includes:
  flow changing instructions (CALL, RETURN, etc.),
  skipped instructions (per BTFSS, BTFSC), or
  the next fetch after a PCL, FSR, or other two cycle instructions.

When another control bit field is set to 01, 10, or 11 in a control register, the breakpoint monitors data accesses, both address and value. The three states of the associated bits select whether read or write cycles are used to determine the breakpoint.

Data breakpoints, by necessity, cause a break at the end of instruction execution, after data is read or written (as applicable). In all cases, the instruction runs to completion. Accordingly, the "break" actually occurs on the next instruction execution, and the PC will indicate the instruction following the trigger instruction. A break may also be triggered when both the memory address and data value qualifiers have been met.

The cycle counter 150 is a counter used to provide a stopwatch function so that user code can be profiled. The cycle counter is controlled by respective control registers. The counter 150 may consist of four 8-bit counter/registers. The counter 150 may be incremented at the end of every Q-cycle of the CPU; multi-cycle instructions (e.g., GOTO) count multiple times.

In order to allow multiple functions to be controlled by specific events, all of the possible sources may be combined into one event bus. This allows the Cycle Counter 150, Trace unit 120, and Event combiners unit 125 to use the same settings to select their actions.

Figure 3:
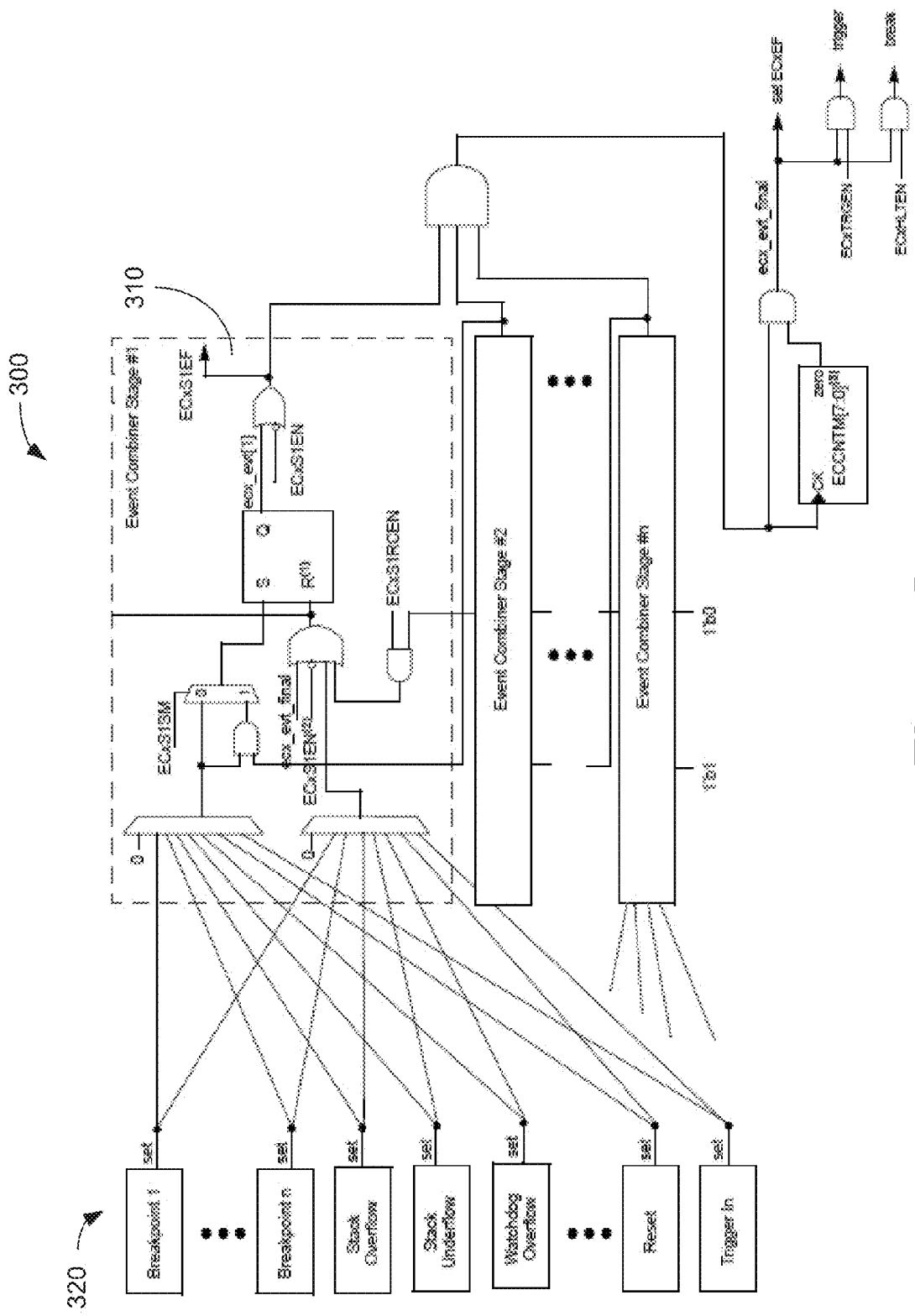
FIG. 3 shows an event combiner block diagram of FIG. 1 in more detail.

An event combiner 300 as shown in FIG. 3 monitors multiple event inputs 320 and can generate a halt or a trigger out 190 based on combinations and sequences of those inputs. An event combiner 300 is enabled when a respective control bit is set. Disabled combiners 300 do not produce output events. Event combiners 300 are listed among the event channel definitions and can be used to start or stop the cycle counter 150, set or reset an event combiner stage 310, start or stop trace unit 120, or take a stack snapshot. Event combiner stages 310 are independently enabled when respective control bits for that stage are set in associated control registers. A stage's current output will be reflected in an associated status bit. Stages 310 have an implied order as shown in FIG. 3, and can be combined in a number of ways:
  a stage can be activated individually by an event,
  a stage can be activated by an event while the next lower stage is active,
  a stage can be deactivated individually by an event,
  a stage can be deactivated by an event or when the next lower stage is deactivated.

By setting a respective control bit, only the (N+1)-th occurrence of the combined event(s) will signal an output event. N can be set from 0 to 255. If the combined trigger conditions are met, then the register is decremented by 1. If the combined trigger conditions are met, an event combiner event is generated and the counter is reloaded with the preset value. Also, any time a new count value is written into the respective control register, the value in the counter is reloaded. For example, to set a breakpoint to trigger on the third occurrence, the respective counter value should be set to 2.

When an event, such as a breakpoint, occurs with an enabled trigger, a pulse on the TRGOUT pin 195 may be generated. The basic trigger output signal operation is configured by setting respective control bits. These control bits may for example control that the Trigger Output is asserted for approximately the duration of the trigger event. Adjacent or overlapping events may hold the signal in the asserted state. The control bits may also control whether the output is stretched to a minimum time period. Once the TRGOUT one-shot is triggered, more events occurring within the timing period will be ignored. After the one-shot times out and TRGOUT returns to zero, it may again be triggered by another event. The one-shot is edge triggered, and will clear after a predefined time period even if the event signal persists.

Software may cause a Trigger Out by setting a respective control bit. If the device is awake, the bit is cleared by hardware after 1 cycle. TRGOUT may also be cleared by writing a respective control bit, or will be cleared automatically when the device wakes up.

The enhanced breakpoint functionality will be explained in more detail as follows with reference to FIG. 4. The circuit shown in FIG. 4 comprises two blocks 400a and 400b.

The first circuit part 400a determines a current state of the central processing unit (CPU) with respect to whether the CPU is operating within an interrupt service or executing its "normal" (non-exception) routine. To this end, a first multiplexer 410 is provided having two inputs, an output, and a control input. The first input "0" receives a feedback signal and the second input "1" is hardwired with a logic 1. The control input of multiplexer 410 receives a logic signal generated by a final stage interrupt detection unit 430. The output of multiplexer 410 is coupled with a first input "0" of a second multiplexer 420 having two inputs, an output, and a control input. The control input of multiplexer 440 receives a further logic signal from a return from interrupt detection unit 440. The second input "1" of multiplexer 420 is hardwired with a logic "0". The output of multiplexer 420 is coupled with the data input of D-flip-flop 450. Flip-flop 450 is clock driven by system clock CLK and generates an output signal at its output Q that is fed back to the first input of multiplexer 410. This output signal indicates whether the CPU is executing code within an interrupt service routine (ISR) or not.

Figure 4:
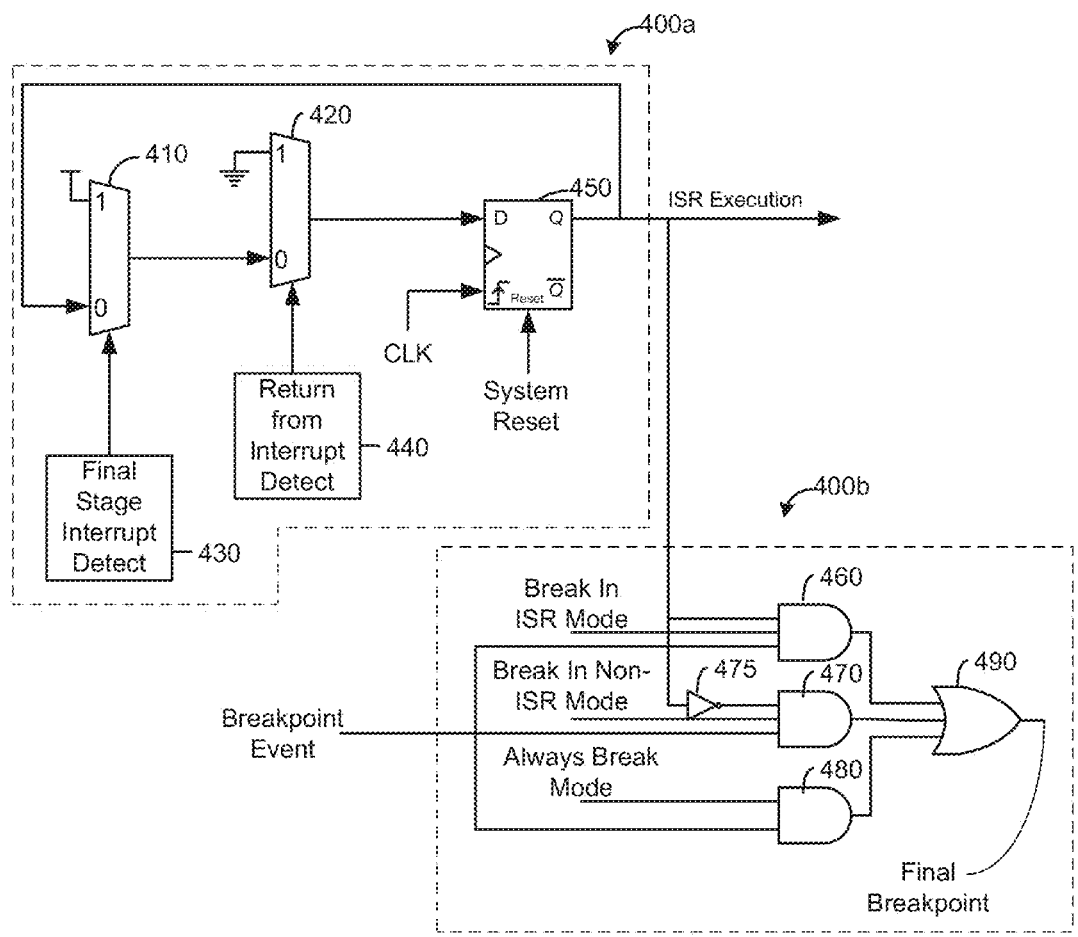
FIG. 4 shows an enhanced breakpoint handling unit.

The second part 400b of the circuit shown in FIG. 4 provides for a function selection. Three operating modes can be selected. A breakpoint event signal can be generated by a breakpoint unit as described above. However, other breakpoint units with more or less functionality may be used according to some embodiments. This breakpoint event signal is fed to first inputs of three AND gates 460, 470, and 480. A second input of each AND gate 460, 470 and 480 receives a logic signal determining the operating mode. For example, a first signal "Break In ISR Mode" may be used to allow detection of breakpoints only when the CPU is executing an interrupt service routine. The second signal "Break In Non-ISR Mode" provides for an operating mode in which breakpoints are only operative when the CPU is not in executing codes in an ISR. The third signal "Always Break Mode" provides for a conventional operating mode in which all active breakpoints are operative notwithstanding the fact whether the CPU executes an interrupt service routine or not. AND gates 460 and 470 provide for a third input which receives the non-inverted output signal from flip-flop 450 and an output signal from flip-flop 450 that is inverted by means of inverter 475, respectively. OR gate 490 having three inputs is provided to receive output signals from the three AND gates 460, 470, and 480. The output of OR gate 490 provides for the final breakpoint signal.

Flip-flop 450 stores the current state of the interrupt execution. The Final Stage Interrupt Detect-Unit 430 is used to determine when the interrupt is occurring. It is important that once the Final Stage Interrupt Detect unit 430 only generates a respective output signal that is active when nothing is allowed to prevent the interrupt from occurring. Otherwise this would cause the detect to be false and a false detect could result in improper behavior. Once the "Final Stage Interrupt Detect" output signal is active, the flip-flop 450 will become set which indicates that the device is currently executing from the Interrupt Service Routine (ISR), and consequently the "ISR Execution" signal will become and remain high.

The flip-flop 450 will clear itself upon "Return From Interrupt Detect." This is typically a special instruction decode that is only used for returning from the ISR. It should be noted that "Final Stage Interrupt Detect" and "Return From Interrupt Detect" are mutually exclusive.

Flip-flop 450 will also clear itself upon a system reset. This is important, because after the system is reset the device, if previously executing from the ISR, would otherwise now be considered to execute from the non-ISR.

Other circuits may be used to determine the current status of the CPU. For example, the CPU may have internal flags that actually show whether an interrupt is being executed or not that could be used as an ISR Execution signal. Furthermore, circuits that allow detection of nested interrupt service routines may be provided that allow execution of prioritized interrupts and therefore allow to interrupt current low priority ISR with a higher prioritized ISR. Essential is that a signal is provided that accurately indicates whether the CPU executes code from an ISR or not.

Block 400b of FIG. 4 shows how such an "ISR Execution" signal can be used by the associated breakpoint logic to either allow or disallow a breakpoint event from occurring. This logic has three mutually exclusive settings: "Break In ISR Mode," which only allows breakpoints inside of the ISR; "Break In Non-ISR Mode," which only allows breakpoints outside of the ISR; and "Always Break Mode," which allows breakpoints regardless of the ISR execution. Combining these two pieces allows the breakpoint to be configured based on the interrupt status. The mutual exclusive signals can be generated by respective configuration logic using one or more configuration registers. For example a bit field in a configuration register may be used to encode the three different operating modes. Other signal decoding may be used according to other embodiments.

Accurately determining that an interrupt is occurring can be difficult. It is necessary to use a signal that indicates, unequivocally, that the interrupt will occur. There are often a staging to the interrupt process and earlier stages in the interrupt can be delayed or blocked to prevent the interrupt from occurring. Only the final signal, which cannot be postponed or blocked, can therefore be used. Upon a device reset, the system has not interrupted and should be considered to be non-ISR execution. Without a proper reset for the flip-flop 450, the state prior to the reset could be retained and improper breakpoint matching would occur.

Figure 5:
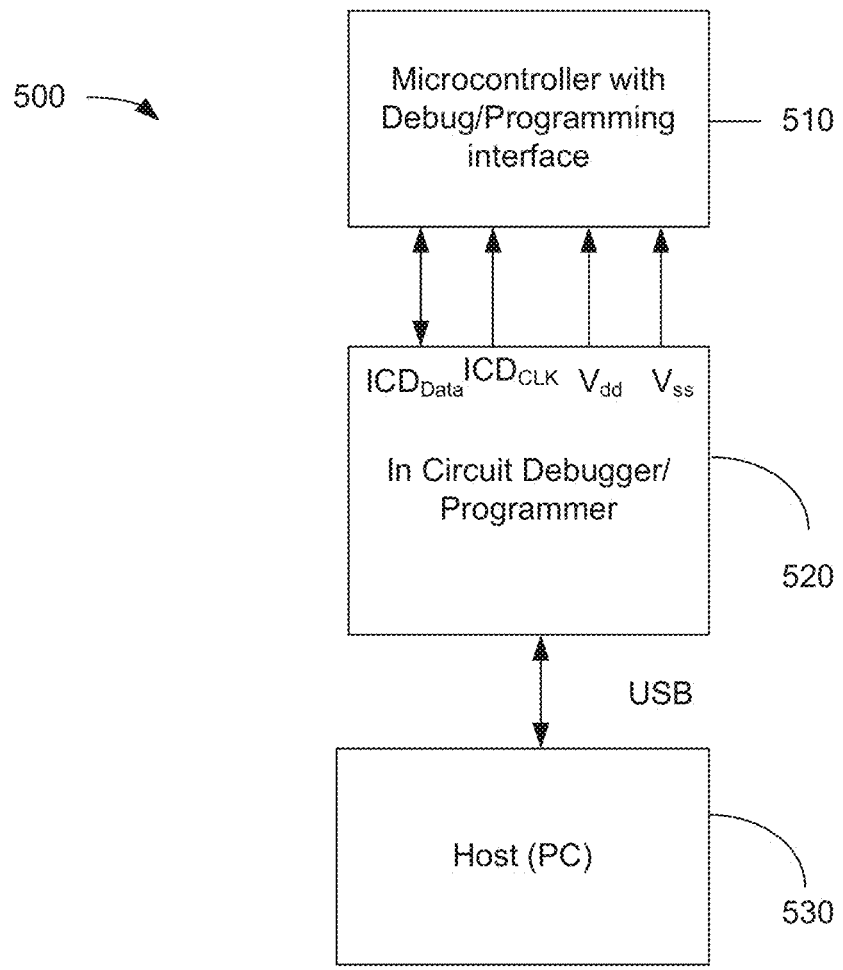
FIG. 5 shows a block diagram of a system using a microcontroller with an embedded debug unit according to various embodiments and an external in circuit debug (ICD) controller.

FIG. 5 shows a typical debugging/programming system with a host such as a personal computer running a development programming and being connected, for example via a USB interface with an external debugger/programming unit 520. The external debugger programming unit 520 provides for a dedicated interface which may supply a power supply voltage generated within the debugger/programmer 520. However, other embodiments may supply the supply voltage via a dedicated power source or the target system may be self powered. The actual debug/programming interface may is provided by a synchronous serial interface with a unidirectional clock signal $ICD_{CLK}$ provided by the debugger/programming unit 520 and a bidirectional data line $ICD_{Data}$. Thus, at a minimum three connection lines, $ICD_{CLK}$, $ICD_{Data}$, and reference potential (GND) may be used to couple the debugger/programming unit 520 with the target system 510 which as a minimum may be a microcontroller with a debugging/programming interface according to various embodiments as described above.

Such a system allows a user to program the debugging program running on the host to set various breakpoints having conditions as explained above. While the debugging software keeps track of the various breakpoints with respect to their position in the source code, the debugger/programmer 520 communicates the breakpoint information to the target device which sets the respective breakpoints and configures its associated registers. For example, a specific breakpoint being triggered by a match of a data value stored in memory may be set and the enhanced function that a breakpoint is only triggered when an interrupt service routine is executed is activated. A user then starts execution of the software of the target device 510 through the debugger software running on the host PC 530. The execution of the target software is only stopped when both conditions are true, namely that the CPU of target 510 executes an interrupt service routine and the specified memory location matched the predefined value. According to another setting, a subroutine may be used both by a main routine of the target software and by an interrupt service routine. If a user encounters trouble with the executed code, in particular when calling the subroutine from an ISR, normally a breakpoint would be set in the respective subroutine. However, if the subroutine is only rarely called by the interrupt service routine, execution of the target software could result in many executions stops caused by the main routine calling the respective subroutine. This could render the debugging entirely useless. According to an embodiment, a user can in such a circumstance set the debugger operating mode to allow breakpoints only when executing interrupt routines as explained above. Now, the execution of the target software is only stopped within the subroutine when the subroutine is called from an interrupt service routine, thereby filtering out numerous other possible breakpoint events that would otherwise stop execution and render a targeted debugging more or less useless.

What is claimed is:

1. A processor device having debug capabilities, comprising:
    a central processing unit;
    an interrupt controller;
    a status unit operable to be set into a first mode indicating an interrupt has occurred or into a second mode indicating normal execution of code;
    a debug unit coupled with said status unit and comprising a configurable breakpoint unit, wherein a condition can be set for a breakpoint that the breakpoint is only activated if the device is executing any instruction within an interrupt service routine and if the status unit is in the first mode.

2. The device according to claim 1, wherein the status unit comprises:
    a final stage interrupt detection unit, and
    a return from interrupt detection unit.

3. The device according to claim 2, wherein the final stage interrupt detection unit only generates a logic signal indicating that an interrupt has occurred when the device will be forced to enter the interrupt service routine.

4. The device according to claim 2, wherein the status unit further comprises:
    a first multiplexer having a first input receiving a logic 1 at a first input and being controlled by the final stage interrupt detection unit;
    a second multiplexer receiving a logic 0 at a first input and having a second input coupled with an output of the first multiplexer, wherein the second multiplexer is controlled by the return from interrupt detection unit;
    a clock controlled register receiving an output signal from the second multiplexer and having an output coupled with a second input of the first multiplexer wherein the output of the register indicates a current interrupt status of the central processing unit.

5. The device according to claim 4, wherein the register is a D-flip-flop.

6. The device according to claim 1, wherein the debug unit can further be configured to activate a breakpoint when the device is not executing an interrupt service routine.

7. The device according to claim 6, wherein the debug unit can further be configured to set an unconditional breakpoint.

8. The device according to claim 7, wherein the debug unit comprises a mode selection circuit comprising logic gates to set one of three operating modes, wherein the first mode allows triggering of a breakpoint only when the central processing unit executes an interrupt service routine, the second mode allows triggering of a breakpoint only when the central processing unit does not execute an interrupt service routine, and the third mode always allows triggering of a breakpoint.

9. The device according to claim 1, wherein the configurable breakpoint unit is operable to allow breakpoints being defined by at least one of the following conditions, an instruction address; an instruction address range; a data read access to a predefined address and a data write access to a predefined address.

10. The device according to claim 9, wherein a condition of a data write access for a breakpoint may further define a data value of a predetermined data address.

11. The device according to claim 9, wherein a number of breakpoint occurrences can be defined that need to be met before execution of a program is stopped at the breakpoint.

12. The device according to claim 9, further comprising an event combiner operable to combine a plurality of events to generate a debug event.

13. A method for debugging executed code within a processor device having debug capabilities, comprising:
    executing code by a central processing unit (CPU);
    determining an interrupt service status of the CPU while executing said code;
    configuring a breakpoint within a debug unit to be activated only when said CPU is executing any instruction within an interrupt service routine after an interrupt has occurred;
    upon occurrence of a breakpoint, only activating said breakpoint within said debug unit if said CPU is executing any instruction within an interrupt service routine after an interrupt has occured.

14. The method according to claim 13, wherein for determining the interrupt service status of the CPU, the debug unit is configured to determine a final stage interrupt state of the CPU which leads to execution of an interrupt service routine, and
    to determine execution of a return from interrupt instruction.

15. The method according to claim 13, wherein the debug unit can further be configured to activate a breakpoint when the device is not executing an interrupt service routine.

16. The method according to claim 15, wherein the debug unit can further be configured to asset an unconditional breakpoint.

17. The method according to claim 13, further comprising the step of selecting an operating mode of the debug unit, wherein a first mode allows triggering of a breakpoint only when the central processing unit executes an interrupt service routine, a second mode allows triggering of a breakpoint only when the central processing unit does not execute an interrupt service routine, and a third mode always allows unconditional triggering of a breakpoint.

18. The method according to claim 13, further comprising configuring a breakpoint configuration to allow breakpoints being defined by at least one of the following conditions: an instruction address; an instruction address range; a data read access to a predefined address and a data write access to a predefined address.

19. The method according to claim 18, wherein a condition of a data write access for a breakpoint may further define a data value of a predetermined data address.

20. The method according to claim 18, wherein a number of breakpoint occurrences can be defined that need to be met before execution of a program is stopped at the breakpoint.

* * * * *